United States Patent
Hotson et al.

(10) Patent No.: US 10,452,946 B2
(45) Date of Patent: Oct. 22, 2019

(54) OBJECT DETECTION USING RECURRENT NEURAL NETWORK AND CONCATENATED FEATURE MAP

(71) Applicant: Ford Global Technologies, LLC., Dearborn, MI (US)

(72) Inventors: Guy Hotson, Palo Alto, CA (US); Parsa Mahmoudieh, Vallejo, CA (US); Vidya Nariyambut Murali, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/226,142

(22) Filed: Dec. 19, 2018

(65) Prior Publication Data
US 2019/0122067 A1    Apr. 25, 2019

Related U.S. Application Data

(63) Continuation of application No. 15/414,383, filed on Jan. 24, 2017, now Pat. No. 10,198,655.

(51) Int. Cl.
*G06K 9/46* (2006.01)
*G06K 9/62* (2006.01)
*G06K 9/00* (2006.01)
*G06T 7/70* (2017.01)

(52) U.S. Cl.
CPC ....... *G06K 9/4604* (2013.01); *G06K 9/00624* (2013.01); *G06K 9/6269* (2013.01); *G06T 7/70* (2017.01); *G06T 2207/10004* (2013.01)

(58) Field of Classification Search
None
See application file for complete search history.

(56) References Cited

U.S. PATENT DOCUMENTS

| | | | |
|---|---|---|---|
| 9,159,137 B2 | 10/2015 | Huang | |
| 2017/0337438 A1* | 11/2017 | el Kaliouby, Jr. | ... A61B 5/0077 |

FOREIGN PATENT DOCUMENTS

| | | |
|---|---|---|
| CN | 103700118 A | 4/2014 |
| CN | 104217214 A | 12/2014 |
| CN | 104299245 A | 1/2015 |
| CN | 105224942 A | 1/2016 |
| CN | 105740767 A | 7/2016 |

\* cited by examiner

*Primary Examiner* — Idowu O Osifade
(74) *Attorney, Agent, or Firm* — David R. Stevens; Stevens Law Group

(57) ABSTRACT

According to one embodiment, a system includes a sensor component and a detection component. The sensor component is configured to obtain a first stream of sensor data and a second stream of sensor data, wherein each of the first stream and second stream comprise a plurality of sensor frames. The detection component is configured to generate a concatenated feature map based on a sensor frame of a first type and a sensor frame of a second type. The detection component is configured to detect one or more objects based on the concatenated feature map. One or more of generating and detecting comprises generating or detecting using a neural network with a recurrent connection that feeds information about features or objects from previous frames.

20 Claims, 8 Drawing Sheets

OBJECT DETECTION USING RECURRENT NEURAL NETWORK AND CONCATENATED FEATURE MAP

RELATED APPLICATIONS

The present disclosure is part of a continuation of U.S. patent application Ser. No. 15/414,383, filed on Jan. 24, 2017, and entitled "Object Detection Using Recurrent Neural Network And Concatenated Feature Map", the content of which is incorporated by reference in its entirety.

TECHNICAL FIELD

The disclosure relates generally to methods, systems, and apparatuses for detecting objects or visual features and more particularly relates to methods, systems, and apparatuses for object detection using a recurrent neural network and concatenated feature map.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Object detection based on sensor data is often necessary to enable automated driving systems or driving assistance systems to safely identify and avoid obstacles or to drive safe.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
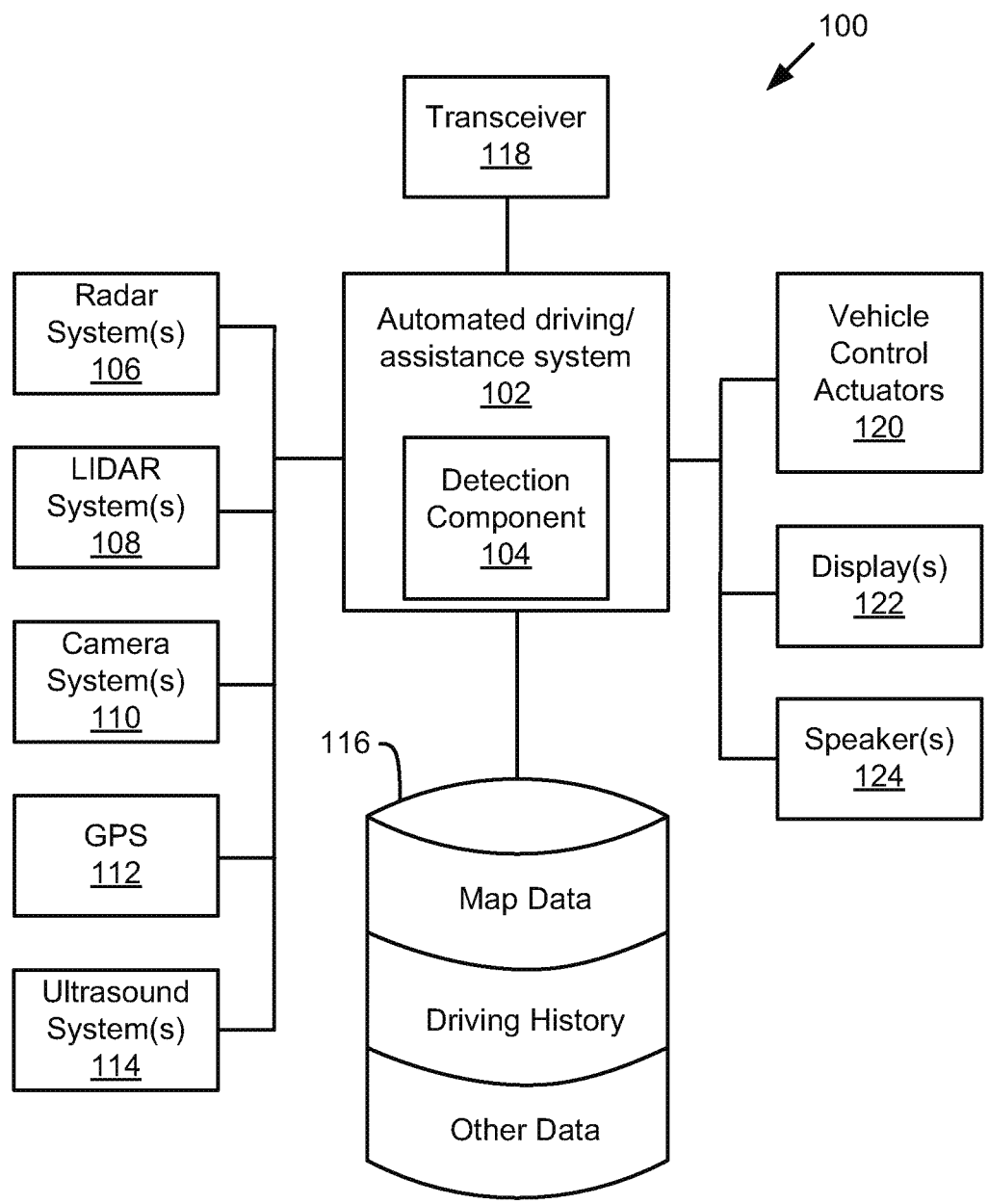
FIG. 1 is a schematic block diagram illustrating an implementation of a vehicle control system that includes an automated driving/assistance system.

For safety reasons, an intelligent or autonomous vehicle may need to be able to classify objects in dynamic surroundings. Deep convolutional neural networks have had great success in the domain of object recognition, even exceeding human performance in some conditions. Deep convolutional neural networks can be highly proficient in extracting mappings of where high level features are found within images. These feature maps may be extracted from convolutions on a static image and then be used for image or object recognition.

State of the art object detection within images/videos has focused on extracting feature maps from static images, then feeding them into classification and regression models for object detection/classification and localization, respectively. Thus, while deep convolutional neural networks have had great success in the domain of object recognition, the detection of an unknown number of objects within a scene yields a much greater challenge. While recent innovations have attained impressive results for detecting objects within static images, applicants have recognized that existing models lack the capability to leverage temporal information for object detection within videos, or other series or streams of sensor data. This can result in unstable object localization, particularly when objects become temporarily occluded.

Furthermore, detecting objects in videos with undesirable lighting conditions remains highly challenging. For example, glare from the sun or dark night-time conditions can render vision-based algorithms almost useless. Applicants have recognized that available models lack the capability to leverage temporal dynamics combined with information from alternative sensors at the feature level for object detection. This can result in unstable object localization that fails in poor lighting conditions.

In the present disclosure, applicants disclose the use of concatenated feature maps and recurrent connections within classification and regression models (such as a neural network) when extracting feature maps from or detecting objects in video sequences. According to one embodiment, a system includes a sensor component and a detection component. The sensor component is configured to obtain a first stream of sensor data and a second stream of sensor data, wherein each of the first stream and second stream comprise a plurality of sensor frames. The detection component is configured to generate a concatenated feature map based on a sensor frame of a first type and a sensor frame of a second type. The detection component is configured to detect one or more objects based on the concatenated feature map. One or more of generating and detecting comprises generating or detecting using a neural network with a recurrent connection that feeds information about features or objects from previous frames (e.g., feature maps or object predictions from the preceding frame or frames).

According to another example embodiment, a method for object detection in videos (or other series of sensor frames) includes determining, using one or more neural networks, an output for a first sensor frame indicating a presence of an object or feature. The method includes feeding the output for the first sensor frame forward as an input for processing a second sensor frame. The method also includes determining an output for the second sensor frame indicating a presence of an object or feature based on the output for the first sensor frame.

In one embodiment, recurrent connections are connections that enable a neural network to use outputs from the previous image frame as inputs to the current image frame. The recurrent connections disclosed herein may effectively allow for neural networks to maintain state information. For example, if a neural network detects a car within the current image frame, this could impact the current state of the network and make it more likely to detect a car at that location, or nearby location, in the next frame. Recurrent layers can be used for attending to dynamic object locations prior to the final object classification and localization layers. They could also be used during the final object classification stage. These recurrent layers may receive inputs from feature maps extracted from one or more layers of the convolutional network.

While feature extraction techniques may have included varying degrees of temporal information, regression and classification models used for attending to and/or classifying objects have focused on static images, ignoring valuable temporal information. Applicant proposes a solution to utilize recurrent connections within the regression and classification models that will enable the object detectors to incorporate estimates of the object locations/types from the previous time frames, thereby improving the predictions. The recurrent connections can provide benefits of object tracking at a lower level and with confidence metrics learned implicitly by the neural models. In one embodiment, techniques disclosed herein may be used for end-to-end object detection algorithms to be applied to such tasks as car, bicycle, and pedestrian detection. Additionally, specific image or sensor data features can be detected using these methods to improve feature detection. Features may include patterns in data such as image data, depth map data, point cloud data, or other data. For example, a feature in image data may include an edge (location of high contrast) or lines with specific curvatures, patterns, or shapes that may be of interest in object detection.

The present disclosure also proposes the use of multiple streams of feature map extractions for information attained from multiple sensor types, such as RGB maps (images) and depth maps. Recurrent connections may be used during fusion of the feature maps or during object detection. Depth maps can be extracted from sensors such as LIDAR, radar, or cameras (such as infrared depth cameras). In the case of sensors that return point clouds (e.g. time of flight sensors like radar or LIDAR), additional processing may be performed to transform the point cloud into a depth map. For example, a modified bilateral filter can be used to smooth the point cloud into a depth map while preserving edges. After the depth map is registered with the RGB camera frame, the depth map can then be additionally decomposed into features such as horizontal disparity, height above ground, and the angle of the pixel's local surface normal.

The depth map may be fed into a deep fully convolutional network to extract a feature map. This may be performed in parallel with the corresponding RGB image frame. A feature map may include a map of which features are found in which locations on an image or other sensor frame. For example, a feature map may indicate regions where features that may correspond to pedestrians are located. The feature maps from the depth and RGB feature maps are then concatenated and further sent through further convolutional layers in the network. The concatenated feature map may include features derived from both an image (e.g., RGB image) and a depth map. For example, a feature map may include all pedestrian or other features detected based on analysis of any available sensor frames for the same time period. For example, a LIDAR point cloud and image frame may be captured within the same time period and the features detected may be combined into a single feature map.

Recurrent layers can be used for attending to dynamic object locations prior to the final object classification and localization layers. They could also be used during the final object classification stage. These recurrent layers will receive inputs from feature maps extracted from the combined depth and RGB feature maps from one or more layers of the convolutional network. This will enable spatiotemporal relations to be extracted from fusions of the color and depth streams.

While feature extraction techniques have included varying degrees of temporal information, regression and classification models used for attending to and/or classifying objects have focused on static images, ignoring valuable temporal information. Applicant proposes a solution to utilize recurrent connections within the regression and classification models that will enable the object detectors to incorporate estimates of the object locations/types from the previous time frames, thereby improving the predictions. This may yield similar or improved benefits over object tracking, but at a lower level and with confidence metrics learned implicitly by the neural models. Furthermore, the use of concatenated feature maps may significantly improve object detection in the case of poor quality for one type of sensor data.

Further embodiments and examples will be discussed in relation to the figures below.

Referring now to the figures, FIG. 1 illustrates an example vehicle control system 100 that may be used to automatically detect, classify, and/or localize objects. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement an algorithm or use a model, such as a deep neural network, to process the sensor data to detect, identify, and/or localize one or more objects. In order to train or test a model or algorithm, large amounts of sensor data and annotations of the sensor data may be needed.

The automated driving/assistance system 102 may include a detection component 104 for detecting objects, image features, or other features of objects within sensor data. In one embodiment, the detection component 104 generates a concatenated feature map based on multiple kinds of streaming sensor data. For example, the detection component 104 may generate a feature map based on an image and a feature map based on a depth map derived from radar, LIDAR, infrared camera, or other sensor data. A concatenated feature map may be generated that includes all of the features from the different sensor maps. Thus, if one sensor is not providing good data, the concatenated feature map may still have all the features or object detected using data from a different sensor.

In one embodiment, the detection component 104 may use recurrent connections in a classification or regression model for detecting object features or objects. For example, the detection component 104 may include or utilize a deep convolutional neural network that outputs, via a classification layer, an indication of whether an object or feature is present. This output may then be fed forward to a subsequent image or sensor frame. Feeding the output of one sensor frame to the next may allow for benefits to similar to object tracking, but at a much lower level that allows a system to benefit from the power of neural networks, such as training and machine learning.

Figure 2:
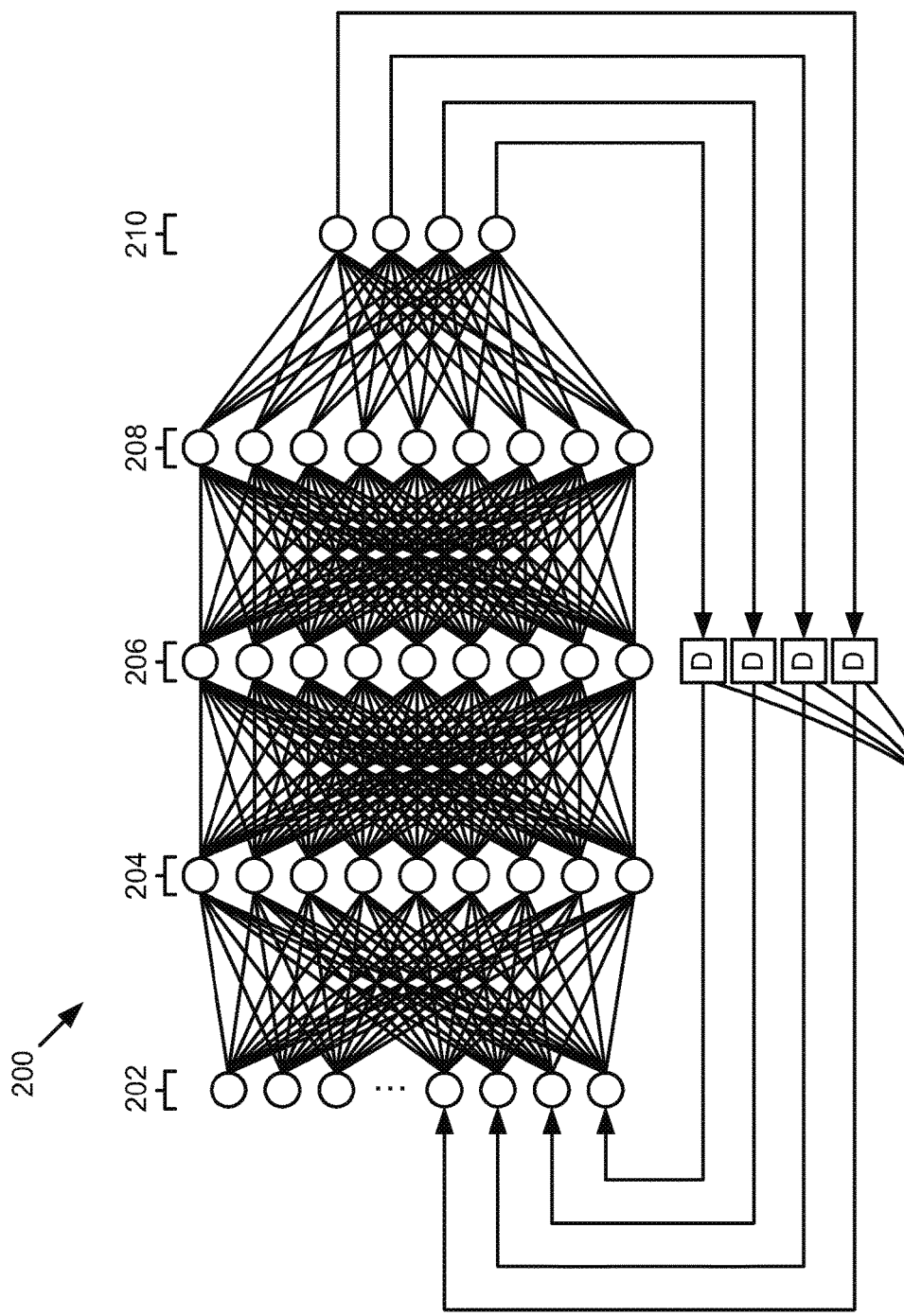
FIG. 2 is a schematic block diagram illustrating a neural network with recurrent connections, according to one implementation.

FIG. 2 is a schematic diagram illustrating a deep neural network 200 with a recurrent connection. Deep neural networks are feed-forward computational graphs with input nodes (such as input nodes 202), one or more hidden layers (such as hidden layers 204, 206, and 208) and output nodes (such as output nodes 210). For classification of contents or information about an image, pixel-values of the input image are assigned to the input nodes, and then fed through the hidden layers 204, 206, 208 of the network, passing through a number of non-linear transformations. At the end of the computation, the output nodes 210 yield values that correspond to the class inferred by the neural network. Similar operation may be used for classification or feature detection of pixel cloud data or depth maps, such as data received from range sensors like LIDAR, radar, ultrasound, or other sensors. The number of input nodes 202, hidden layers 204-208, and output notes 210 is illustrative only. For example, larger networks may include an input node 202 for each pixel of an image, and thus may have hundreds, thousands, or other number of input nodes.

According to one embodiment, a deep neural network 200 of FIG. 2 may be used to classify the content(s) of an image into four different classes: a first class, a second class, a third class, and a fourth class. According to the present disclosure, a similar or differently sized neural network may be able to output a value indicating whether a specific type of object is present within the image (or of sub-region of the image that was fed into the network 200). For example, the first class may correspond to whether there is a vehicle present, the second class may correspond to whether there is a bicycle present, the third class may correspond to whether there is a pedestrian present, and the fourth class may correspond to whether there is a curb or barrier present. An output corresponding to a class may be high (e.g., 0.5 or greater) when an object in the corresponding class is detected and low (e.g., less than 0.5) when an object of the class is not detected. This is illustrative only as a neural network to classify objects in an image and may include inputs to accommodate hundreds or thousands of pixels and may need to detect a larger number of different types of objects. Thus, a neural network to detect or classify objects in a camera image or other sensor frame may require hundreds or thousands of nodes at an input layer and/or more than (or less than) four output nodes.

For example, feeding a portion of a raw sensor frame (e.g., an image, LIDAR frame, radar frame, or the like captured by the captured by sensor of a vehicle control system 100) into the network 200 may indicate the presence of a pedestrian in that portion. Therefore, the neural network 100 may enable a computing system to automatically infer that a pedestrian is present at a specific location within an image or sensor frame and with respect to the vehicle. Similar techniques or principles may be used to infer information about or detecting vehicles, traffic signs, bicycles, barriers, and or the like.

A neural network (with or without recurrent connections) may also be used to identify or detect features within a sensor frame or within sub-regions of a sensor frame.

The neural network 200 also includes a plurality of recurrent connections between the output nodes 210 and the input nodes 202. Values at the output nodes 210 may be fed back through delays 212 to one or more input nodes. The delays 212 may delay/save the output values for input during a later sensor frame. For example, a subset of the input nodes 202 may receive the output from a previous sensor frame (such as an image frame) while the remaining input nodes 202 may receive pixel or point values for a current sensor frame. Thus, the output of the previous frame can affect whether a specific object or feature is detected again. For example, if a pedestrian is detected in the image, the output indicating the presence of the pedestrian may be fed into an input node 202 so that the network is more likely to detect the pedestrian in the subsequent frame. This can be useful in video where there a series of images are captured and a vehicle needs to detect and avoid obstacles. Additionally, any sensor that provides a series of sensor frames (e.g., such as LIDAR or RADAR) can also benefit from the recurrent connection.

Although the neural network 200 is shown with the recurrent connection between the output nodes 210 and the input nodes 202, the recurrent connection may occur between any node or layer in different embodiments. For example, a recurrent connection may feed the values of the output nodes 210 into nodes in a hidden layer (e.g., 204, 206, and 208) or as input into the output nodes 210. The recurrent connections may allow the detection of objects or features from a previous sensor frame to affect the detection of objects or features for a later sensor frame.

In order for a deep neural network to be able to distinguish between any desired classes, the neural network needs to be trained based on examples. Once the images with labels (training data) are acquired, the network may be trained. One example algorithm for training includes the back propagation-algorithm that may use labeled sensor frames to train a neural network. The training may not only train the neural network 200 on how to detect objects or features based on sensor data, but also based on outputs or information determined from a previous set of pixel/frame data. Once trained, the neural network 200 may be ready for use in an operating environment.

Figure 3:
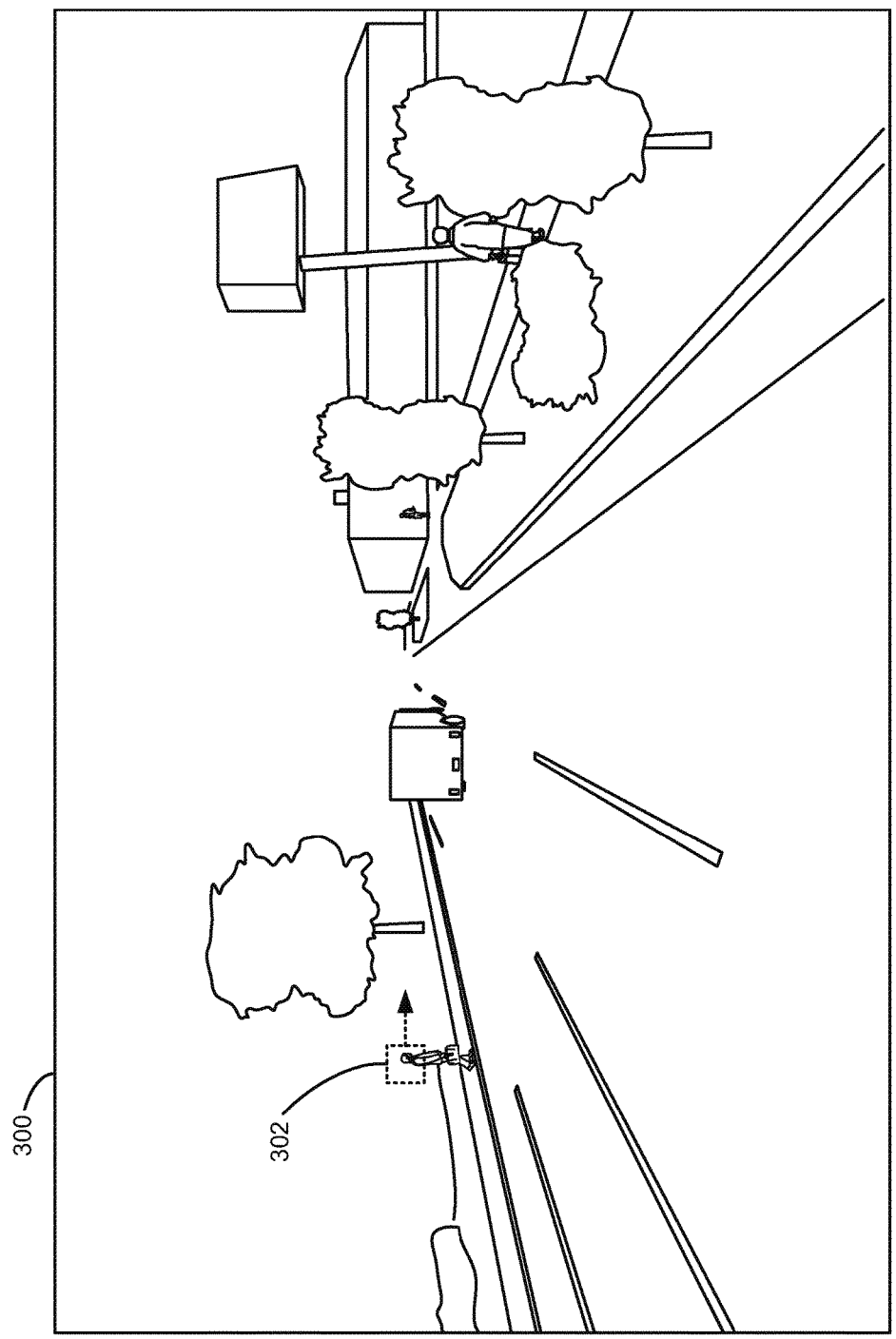
FIG. 3 is illustrates a perspective view of a roadway as captured by a vehicle camera, according to one implementation.

FIG. 3 illustrates an image 300 of a perspective view that may be captured by a camera of a vehicle in a driving environment. For example, the image 300 illustrates a scene of a road in front of a vehicle that may be captured while a vehicle is traveling down the road. The image 300 includes a plurality of objects of interest on or near the roadway. In one embodiment, the image 300 is too large to be processed at full resolution by an available neural network. Thus, the image may be processed one sub-region at a time. For example, the window 302 represents a portion of the image 302 that may be fed to a neural network for object or feature detection. The window 302 may be slid to different locations to effectively process the whole image 302. For example, the window 302 may start in a corner and then be subsequently moved from point to point to detect features.

In one embodiment, different sizes of sliding windows may be used to capture features or objects at different resolutions. For example, features or objects closer to a camera may be more accurately detected using a larger window while features or objects further away from the camera may be more accurately detected using a smaller window. Larger windows may be reduced in resolution to match the number of input nodes of a neural network. For example, the image 300 may be down sampled to process the full image 300 or a larger portion or different scale window 302 of the image 300.

In one embodiment, outputs of a neural network for each location of the window 302 may be fed forward for the same or nearby location of the window 302 on a subsequent image. For example, if a pedestrian is detected by a neural network at one location in a first image, an indication that a pedestrian was detected at that location may be fed forward during pedestrian detection at that location for a second, later image using the neural network. Similarly, features detected at a specific location in an image or other sensor frame may be fed forward. Thus, objects or features in a series of images may be consistently detected and/or tracked at the neural network or model layer.

In one embodiment, after or as a result of processing using a sliding window, a feature map may be generated that indicates what features or objects were located at which locations. The feature map may include indications of low level image (or other sensor frame) features that may be of interested in detecting objects or classifying objects. For example, the features may include boundaries, curves, corners, or other features that may be indicative of the type of object at a location (such as a vehicle, face of a pedestrian, or the like). The feature maps may then be used for object detection or classification. For example, a feature map may be generated and then the feature map and/or the region of the image may be processed to identify a type of object and/or track a location of the object between frames of sensor data. The feature map may indicate where in the image 300 certain types of features are detected. In one embodiment, a plurality of different recurrent neural networks may be used to generate each feature map. For example, a feature map for pedestrian detection may be generated using a neural network trained for pedestrian detection while a feature map for vehicle detection may be generated using a neural network trained for vehicle detection. Thus, a plurality of different feature maps may be generated for the single image 300 shown in FIG. 3. As discussed previously, the detected features may be fed forward between frames for the same sub-regions to improve feature tracking and/or object detection.

Although FIG. 3 shows an image, similar processing can be performed on any type of sensor data or frame of data. For example, a depth map may be similarly processed using windows, neural networks, and the like to detect features or objects. In one embodiment, frames of different types of sensor data may each be processed to generate one or more feature maps that can then be combined into a concatenated feature map. With the concatenated feature map, the features may include all features detected by any of the available sensors or data sources. Thus, even if no features are detected based on data from one of the sensors, the features detected based on data from the remaining sensors may still provide enough information for accurate and reliable feature or object detection. For example, vehicles or objects may still be detected in the dark or in sun glare situations based on the features from LIDAR, radar, or other sensor sources. Additionally, the recurrent connections between frames may allow for detection of objects or features in even very poor conditions if a previous frame found the objects or features.

Figure 4:
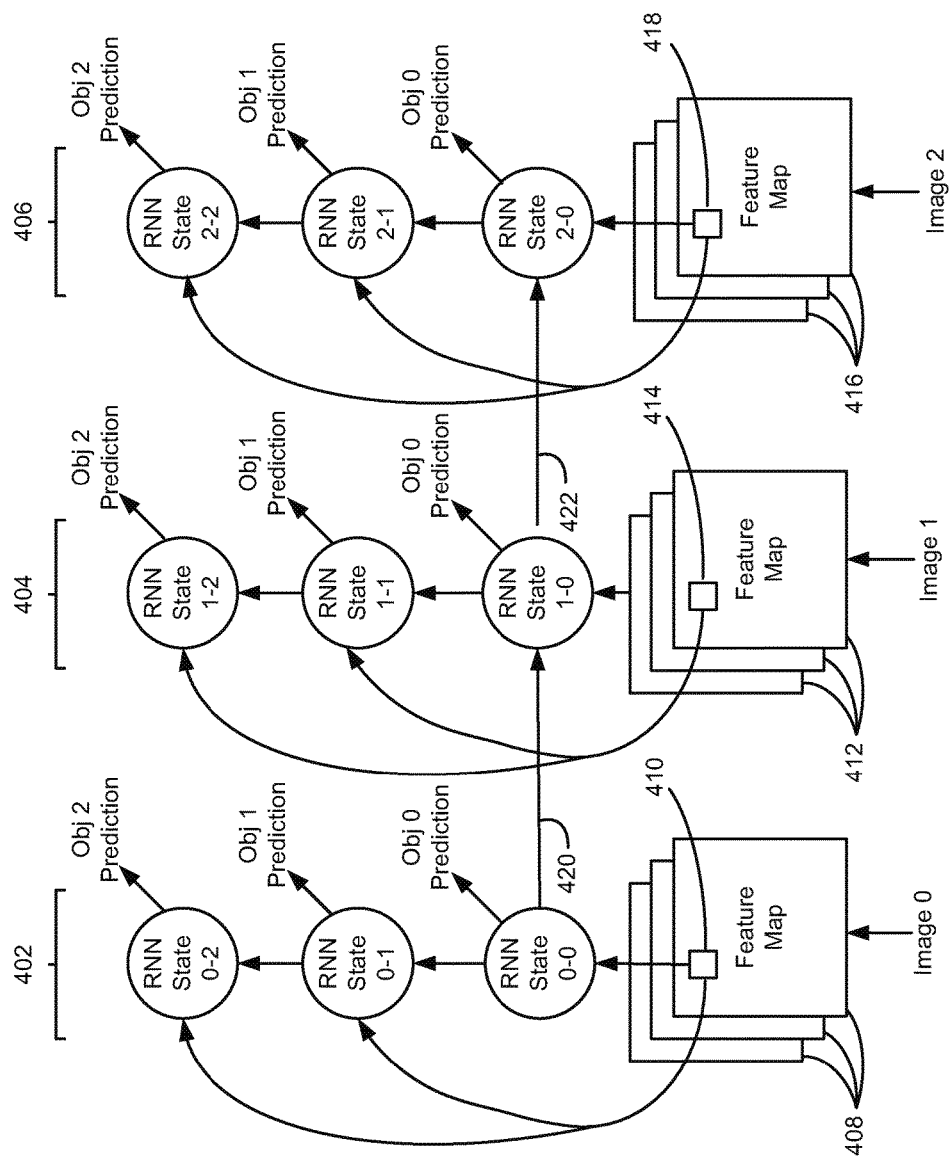
FIG. 4 is a schematic block diagram illustrating incorporation of temporal information between frames of sensor data during object detection, according to one implementation.

FIG. 4 is a schematic block diagram illustrating incorporation of temporal information between frames of sensor data during object detection. A plurality of processing stages including a first stage 402, second stage 404, and third stage 406 for processing of different images, including Image 0, Image 1, and Image 2 are shown. Each stage 402, 404, 406 may correspond to a different time period for processing a different set of sensor data. For example, the stages may correspond to real-time processing during acquisition of sensor data. The first stage 402 shows the input of Image 0 for the generation of one or more feature maps 408. The feature maps 408 may be generated using one or more neural networks. For each sub-region 410 (such as a location of the window 302 of FIG. 3), an object prediction is generated. Both the feature map generation and the object prediction may be performed using one or more neural networks.

The object predictions may indicate an object type, and/or an object location. For example, a '0' value for the object prediction may indicate that there is no object, a '1' may indicate that the object is a car, a '2' may indicate that the object is a pedestrian, and so forth. A location value may also be provided that indicates where in the sub-region 410 the object is located. For example, a second number may be included in the state that indicates a location in the center, right, top, or bottom of the sub-region 410. Recurrent neural network (RNN) state 0-0 is the resulting prediction for object 0 at the sub-region 410, RNN state 0-1 is the resulting prediction for object 1 at the sub-region 410, and RNN state 0-2 is the resulting prediction for object 2 at the sub-region 410. Thus, a plurality of objects and/or object predictions may be detected or generated for each sub-region 410.

The state information, including RNN state 0-0, RNN state 0-1, and RNN state 0-2 from stage 402 is fed forward using a recurrent connection 420 for use during processing of the next image, Image 1 during stage 404. For example, the object predictions and associated values may be fed into a neural network along the recurrent connection 420 as input to one or more nodes of the same one or more neural networks during processing of Image 1 and/or its feature maps 412. During stage 404, object predictions are generated based not only on Image 1 and the feature maps 412, but also based on RNN state 0-0, RNN state 0-1, and RNN state 0-2. The result of prediction results in RNN state 1-0, RNN state 1-1, and RNN state 1-2 for the sub-region 414. The recurrent connection 420 may feed forward state information for the same sub-region 410. Thus, only state information for the same sub-region from the previous image may be used to determine an object prediction or feature detection for a current image. In one embodiment, detected features in the feature maps 408 are also fed forward along the recurrent connection 420. Thus, recurrent neural networks may be used to generate the feature maps as well as the object predictions.

During stage 406, object predictions are generated based not only on Image 2 and the feature maps 416, but also based on the state information including RNN state 1-0, RNN state 1-1, and RNN state 1-2, which is fed forward using a recurrent connection 422 for use during processing of Image 2 for sub-region 418. Object predictions for RNN state 2-0, RNN state 2-1, and RNN state 2-2 are determined based on Image 2 as well as the state information including RNN state 1-0, RNN state 1-1, and RNN state 1-2 from Image 1. Additionally, the feature maps 416 may be generated based on the feature maps (or locations of detected features) for the previous, second stage 404.

In one embodiment, the processing that occurs in each stage 402, 404, 406 occurs in real-time on a stream of incoming sensor data. For example, when processing a video, each frame of the video may be processed and the corresponding object predictions, feature detections, and/or feature maps may be saved/input into the models or neural networks when the next frame of the video is received. Thus, the recurrent connections 420, 422 allow for object predictions to be carried over from an earlier frame to a later frame. Thus, temporal information may be incorporated at the model or neural network level, which allows a neural network to be trained to and process not only information for a present sensor frame but also previous sensor frames. This is different from embodiments where features are extracted anew for each frame and then discarded. In one embodiment, a single neural network, or set of neural networks is used during each stage such that the recurrent connections 420, 422 simply feedback outputs from previous frames as input into a current frame.

Figure 5:
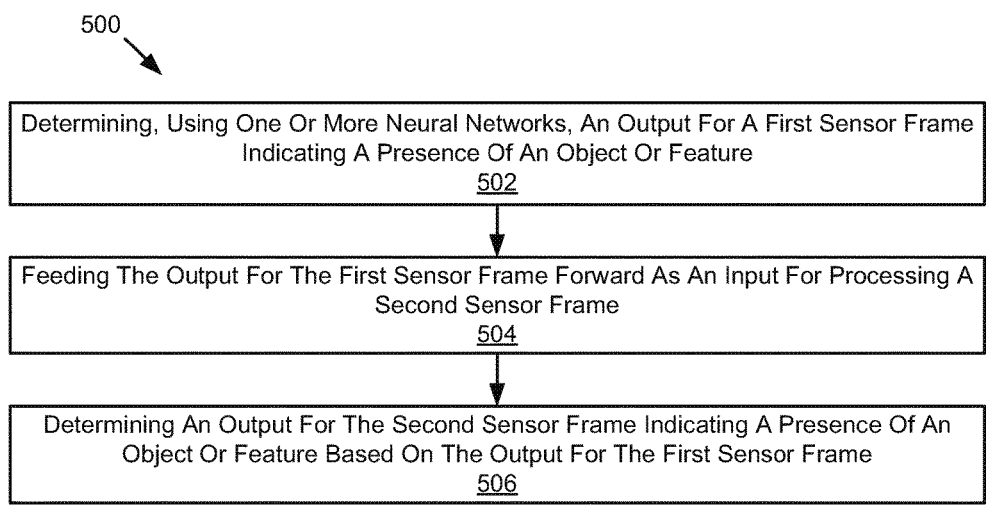
FIG. 5 is a schematic flow chart diagram illustrating a method for object detection, according to one implementation.

FIG. 5 is a schematic flow chart diagram illustrating a method 500 for object detection. The method 500 may be performed by a detection component or vehicle control system such as the detection component 104 or vehicle control system 100 of FIG. 1.

The method 500 begins and a detection component 104 determines at 502, using one or more neural networks, an output for a first sensor frame indicating a presence of an object or feature. For example, the detection component 104 may determine at 502 any of the object prediction or states (such as RNN state 0-0, RNN state 0-1, RNN state 0-2, RNN state 1-0, RNN state 1-1, or RNN state 1-2) of FIG. 4. The detection component 102 may determine at 502 the states based on data in a sensor frame in a series of sensor frames. A sensor component (which may include a radar system 106, LIDAR system 108, camera system 110, or other sensor) may capture or obtain sensor frames that include image data, LIDAR data, radar data, or infrared image data. A detection component 104 feeds at 504 the output (which may include an indication of detected features or objects) for the first sensor frame forward as an input for processing a second sensor frame. For example, the detection component 104 may include or use a recurrent connection in a neural network. The detection component 104 determines at 506 an output for the second sensor frame indicating a presence of an object or feature based on the output for the first sensor frame. For example, the detection component 104 may determine any of the object prediction or states (such as RNN state 1-0, RNN state 1-1, RNN state 1-2, RNN state 2-0, RNN state 2-1, or RNN state 2-2) of FIG. 4 based on the states or a previous stage.

The method 500 may include providing output or predictions to another system for decision making. For example, the automated driving/assistant system 102 of FIG. 1 may determine a driving maneuver based on a detected object or feature. Example maneuvers include crash avoidance maneuvers or other driving maneuvers to safely drive the vehicle. The method 500 may also include training the one or more neural networks to generate output based on data for a later image frame using an output from an earlier frame. The method 500 may allow for more efficient and accurate object detection and tracking in a series of sensor frames, such as within video. The improved object detection and tracking may improve driving and passenger safety and accuracy.

Figure 6:
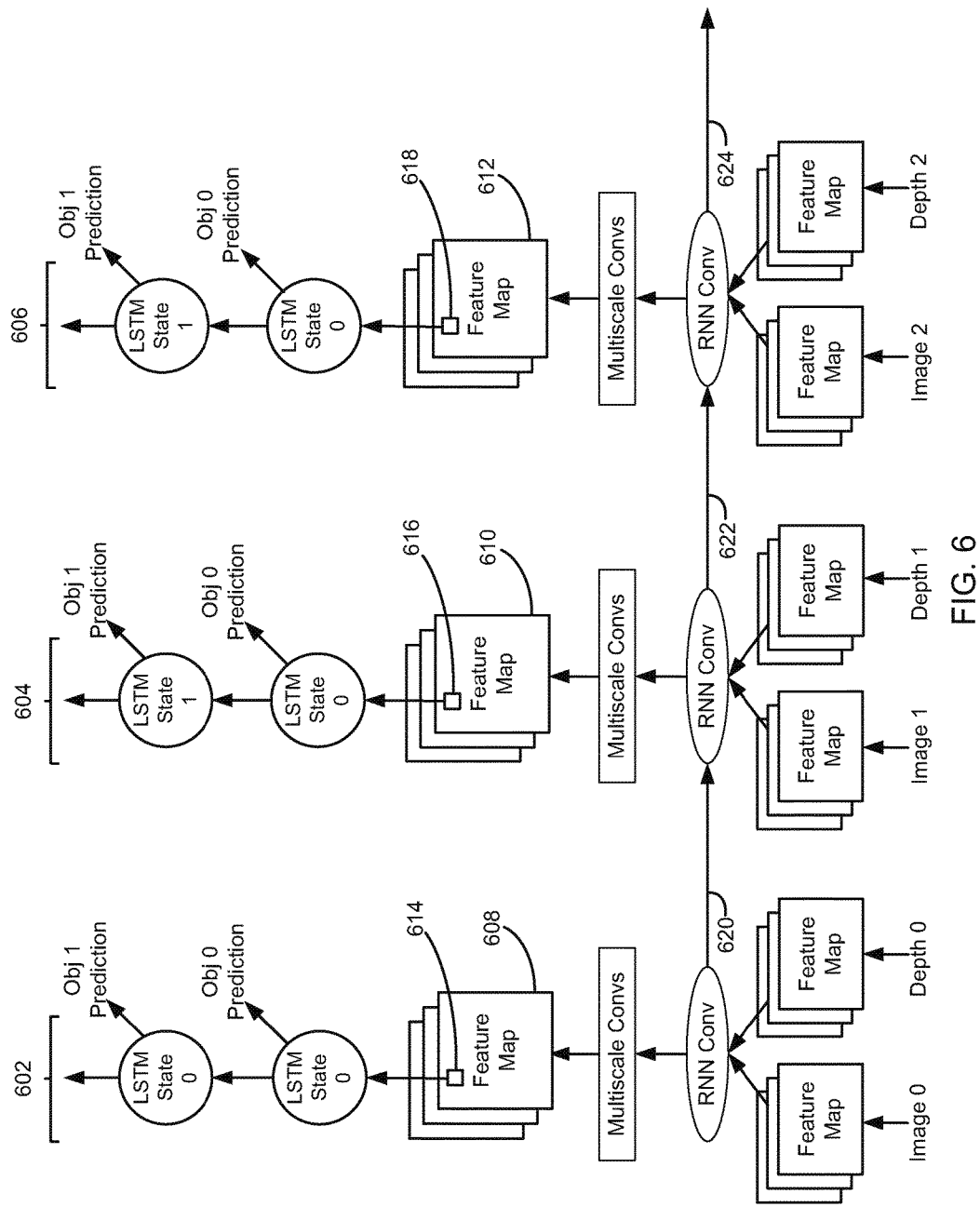
FIG. 6 is a schematic block diagram illustrating creation and use of a concatenated feature map in combination with incorporation of temporal information between frames of sensor data during object detection, according to one implementation.

FIG. 6 is a schematic block diagram illustrating incorporation of temporal information from multiple types of sensor data and between sets of frames of sensor data during object detection. A plurality of processing stages including a first stage 602, second stage 604, and third stage 606 for processing of different sets of sensor frames are shown. The sensor frames include images (Image 0, Image 1, and Image 2) as well as depth maps (Depth 0, Depth 1, and Depth 2) which are processed during their respective stages, although other types of sensor data or frames may be used. Each stage 602, 604, 606 may correspond to a different time period for processing a different set of sensor data. For example, the stages may correspond to real-time processing during acquisition of sensor data of the most recently captured sensor data.

The first stage 602 shows the input of Image 0 and Depth 0 which are each processed to generate one or more feature maps. For example, Image 0 may be processed with one or more neural networks to generate one or more different feature maps that reflect where certain types of features were detected. Similarly, more than one feature map may be generated based on Depth 0. The feature maps are input into a convolutional recurrent neural network or other model which uses multiscale convolutions to generate concatenated feature maps 608. The concatenated feature maps 608 may include all the features of the respective sensor feature maps. For example, a concatenated feature map may include indications of features detected by both an image feature map and a depth feature map.

The concatenated feature maps may be processed for object detection. For each sub-region 614 (such as a location of the window 302 of FIG. 3), an object prediction is generated. The sensor feature map generation, concatenated feature map generation, and the object prediction may be performed using one or more neural networks. The object predictions may include Obj 0 prediction and an Obj 1 prediction, which were generated based on the sub-region 614 of the concatenated feature map 608. The object prediction may include an object type or classification as well as location.

Similar to the embodiment of FIG. 4, recurrent connections 620, 622 feed forward information between processing stages. For example, feature maps, detected features, object predictions, or the like may be bed forward to a recurrent convolutional neural network for use during processing of a subsequent set of images. Thus, temporal information may be taken into account during object or feature detection. The feature or objects detected for a previous time period (e.g., the time period corresponding to a previous set of sensor frames) may be fed forward and affect whether those same objects or feature are detected for a later set of sensor frames. During stage 604 and stage 606, similar generation of concatenated feature maps 610 and 612 and object predictions for sub-regions 616 and 618 can be performed and fed forward using recurrent connections 622 and 624.

Figure 7:
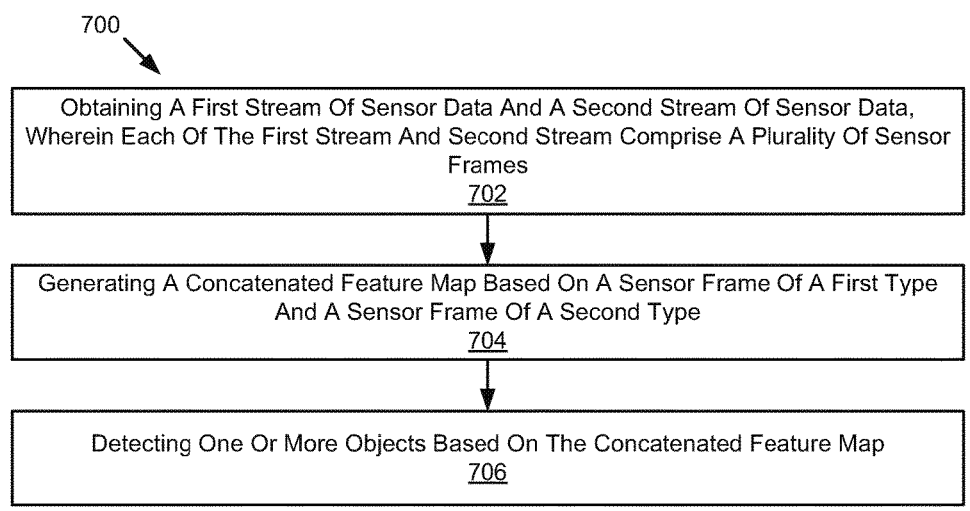
FIG. 7 is a schematic flow chart diagram illustrating another method for object detection, according to one implementation.

FIG. 7 a schematic flow chart diagram illustrating a method 700 for object detection. The method 700 may be performed by a detection component or vehicle control system such as the detection component 104 or vehicle control system 100 of FIG. 1.

The method 700 begins and one or more sensor components obtain at 702 a first stream of sensor data and a second stream of sensor data. Each of the first stream and second stream include a plurality of sensor frames. For example, a sensor component may include one or more of the sensors 106, 108, 110, 114, or other sensor. A detection component 104 generates at 704 a concatenated feature map based on a sensor frame of a first type and a sensor frame of a second type. The sensor frame may be from or based on the first stream and the sensor frame of the second type may be from or based on the second stream. The detection component 104 detects at 706 one or more objects based on the concatenated feature map. In one embodiment, one or more of generating at 704 and detecting at 706 comprises generating or detecting using a neural network with a recurrent connection that feeds information about features or objects from previous frames.

Figure 8:
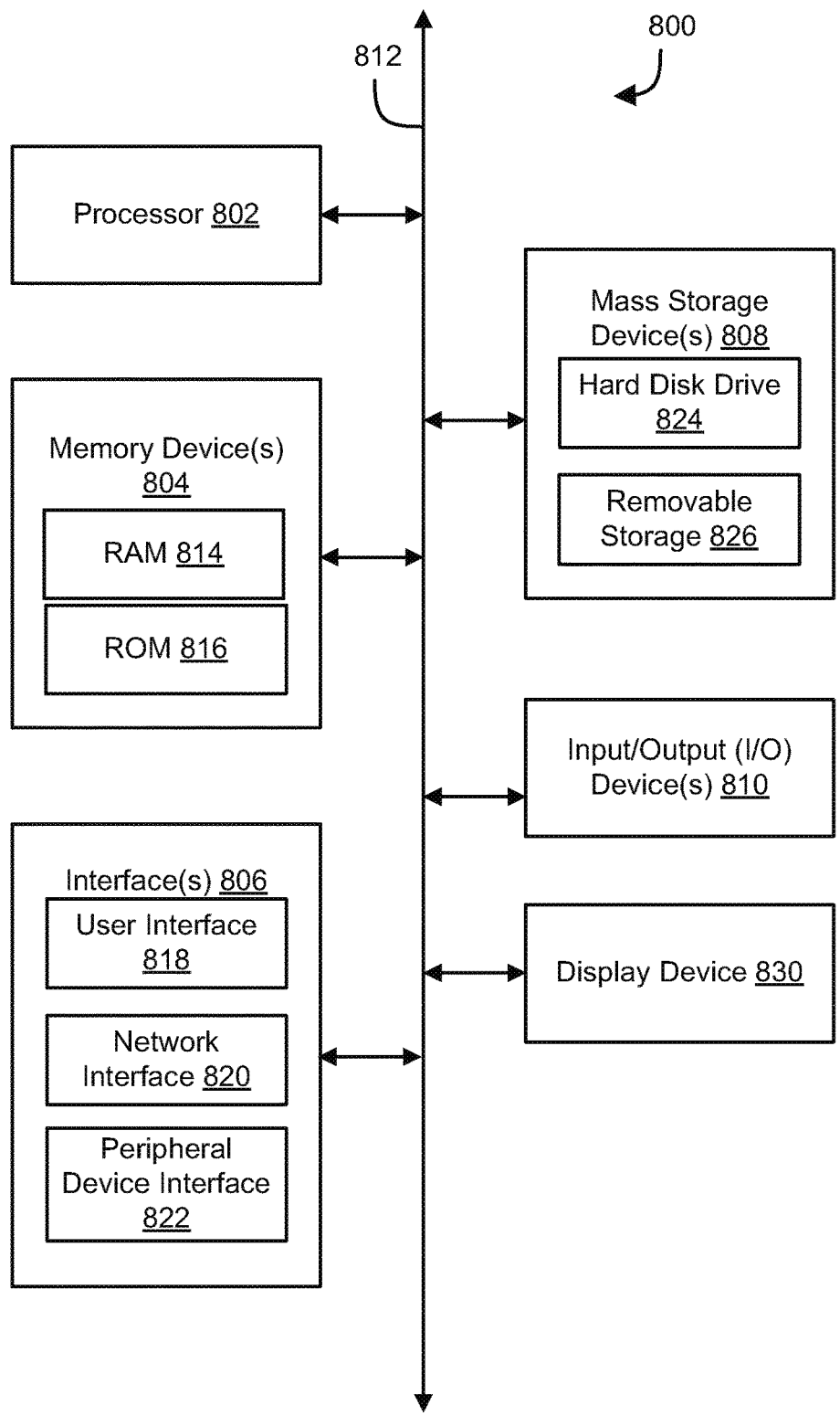
FIG. 8 is a schematic block diagram illustrating a computing system, according to one implementation.

Referring now to FIG. 8, a block diagram of an example computing device 800 is illustrated. Computing device 800 may be used to perform various procedures, such as those discussed herein. In one embodiment, the computing device 800 can function as a detection component 104, automated driving/assistance system 102, vehicle control system 100, or the like. Computing device 800 can perform various monitoring functions as discussed herein, and can execute one or more application programs, such as the application programs or functionality described herein. Computing device 800 can be any of a wide variety of computing devices, such as a desktop computer, in-dash computer, vehicle control system, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for detecting objects or features in sensor data. The method includes generating a concatenated feature map based on a sensor frame of a first type and a sensor frame of a second type. The method includes detecting one or more objects based on the concatenated feature map. In the method, one or more of generating and detecting includes generating or detecting using a neural network with a recurrent connection that feeds information about features or objects from previous frames.

In Example 2, the method of Example 1 further includes generating a first feature map based on the sensor frame of the first type and generating a second feature map based on the sensor frame of the second type. Generating the concatenated feature map includes generating based on the high-level features in the first feature map or the second feature map.

In Example 3, generating the concatenated feature map as in Example 2 includes generating a fused feature map that includes the features from both the first feature map and the second feature map.

In Example 4, the sensor frame of the first type as in any of Examples 1-3 includes an image and the sensor frame of the second type includes a depth map.

In Example 5, the recurrent connection of the neural network as in any of Examples 1-4 feeds forward one or more of a feature in a previous concatenated feature map, an object detected in a previous frame or time period, and a feature in a previous sensor frame.

In Example 6, the sensor frame of the first type as in any of Examples 1-5 includes a first sensor frame of the first type, the sensor frame of the second type includes a first sensor frame of the second type, the concatenated feature map includes a first concatenated feature map, and the one or more objects include first one or more objects. The method further includes generating a second concatenated feature map based on a second sensor frame of the first type and a second sensor frame of the second type. The method further includes detecting second one or more objects based on the second concatenated feature map. The method further includes feeding forward one or more of a feature of the second concatenated feature map or the second one or more objects using the recurrent connection of the neural network for generating the first concatenated feature map or detecting the first one or more objects.

In Example 7, the neural network as in any Examples 16 includes an input layer, one or more hidden layers, and a classification layer. The recurrent connection feeds an output of the classification layer from previous frames into one or more of the input layer or a hidden layer of the one or more hidden layers during generating the concatenated feature map or detecting the one or more objects.

In Example 8, the method as in any of Examples 1-7 includes determining a feature or detecting an object for a plurality of sub-regions, wherein a feature or object for the plurality of sub-regions is fed forward as input for a corresponding sub-region for a later time period.

In Example 9, determining a feature or detecting an object for a plurality of sub-regions as in Example 8 includes determining features or detecting objects for different sized sub-regions to detect different sized features or objects.

In Example 10, the recurrent connection as in any of Examples 1-9 feeds forward information including one or more of an indication of a type of object or feature detected or an indication of a location of the object or feature.

In Example 11, the method as in any of Examples 1-10 further includes determining a driving maneuver based on the detected one or more objects or features of the concatenated feature map.

In Example 12, the method as in any of Examples 1-11 further includes training the neural network to detect objects or features using the recurrent connection.

Example 13 is computer readable storage media storing instructions that, when executed by one or more processors, cause the one or more processors to implement a method as in any of Examples 1-12.

Example 14 is a system or device that includes means for implementing a method or realizing a system or apparatus in any of Examples 1-13.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method comprising:
    extracting object features from a depth map to generate a first feature map by processing the depth map using a neural network, wherein the depth map is based on range sensor data;
    extracting object features from an image to generate a second feature map by processing the image using the neural network;
    concatenating the first feature map and the second feature map to generate a concatenated feature map; and
    detecting one or more objects based on the concatenated map by processing the concatenated map using the neural network.

2. The method of claim 1, wherein generating the first feature map comprises generating based on high-level features in the depth map, and wherein generating the second feature map comprises generating based on high-level features in the image.

3. The method of claim 2, wherein generating the concatenated feature map comprises fusing features from the first feature map and the second feature map.

4. The method of claim 1, wherein the neural network feeds forwards one or more of:
    a feature in a previous feature map;
    an object detected in a previous frame or time period; or
    a feature in a previous depth map.

5. The method of claim 1, further comprising:
    generating a subsequent first feature map based on a subsequent depth map that is based on subsequent range data;
    generating a subsequent second feature map based on a subsequent image; and feeding forward one or more of a feature of the first feature map or the second feature map using recurrent connections in the neural network.

6. The method of claim 1, wherein the neural network comprises an input layer, one or more hidden layers, and a classification layer, wherein a recurrent connection of the neural network feeds an output of the classification layer from the previous frames into one or more of the input layer or a hidden layer of the one or more hidden layers during generating the feature map or detecting the one or more objects.

7. The method of claim 1, wherein the concatenated map comprises a fusion of extracted object features from the depth map and extracted object features from the image.

8. The method of claim 1, wherein the range sensor data comprises one or more of light detection and ranging (LIDAR) sensor data or depth camera data.

9. A system comprising:
   a sensor of a vehicle;
   a camera of the vehicle; and
   a processor that is programmable to execute instructions stored in non-transitory computer readable storage media, the instructions comprising:
   receiving sensor data from the sensor and an image from the camera;
   generating a depth map based on the sensor data;
   extracting object features from the depth map to generate a first feature map by processing the depth map using a neural network;
   extracting object features from an image to generate a second feature map by processing the image using the neural network;
   concatenating the first feature map and the second feature map to generate a concatenated feature map; and
   detecting one or more objects based on the concatenated map by processing the concatenated map using the neural network.

10. The system of claim 9, wherein generating the first feature map comprises generated base on high-level features in the depth map, and wherein generating the second feature map comprises generating based on high-level features in the image.

11. The system of claim 10, wherein generating the concatenated feature map comprises fusing features from the first feature map and the second feature map.

12. The system of claim 9, wherein the neural network feeds forwards one or more of:
   a feature in a previous feature map;
   an object detected in a previous frame or time period; or
   a feature in a previous depth map.

13. The system of claim 9, wherein the instructions further comprise:
   generating a subsequent first feature map based on a subsequent depth map that is based on subsequent range data;
   generating a subsequent second feature map based on a subsequent image; and
   feeding forward one or more of a feature of the first feature map or the second feature map using recurrent connections in the neural network.

14. The system of claim 9, wherein the neural network comprises an input layer, one or more hidden layers, and a classification layer, wherein a recurrent connection of the neural network feeds an output of the classification layer from the previous frames into one or more of the input layer or a hidden layer of the one or more hidden layers during generating the feature map or detecting the one or more objects.

15. Non-transitory computer readable storage media storing instructions that, when executed by one or more processors, cause the one or more processors to:
   extract object features from a depth map to generate a first feature map by processing the depth map using a neural network, wherein the depth map is based on range sensor data;
   extract object features from an image to generate a second feature map by processing the image using the neural network;
   concatenating the first feature map and the second feature map to generate a concatenated feature map; and
   detect one or more objects based on the concatenated map by processing the concatenated map using the neural network.

16. The non-transitory computer readable storage media of claim 15, wherein the instructions cause the one or more processors to generate the first feature map by generating based on high-level features in the depth map and generate the second feature map by generating based on high-level features in the image.

17. The non-transitory computer readable storage media of claim 16, wherein the instructions cause the one or more processors to generate the concatenated feature map by fusing features from the first feature map and the second feature map.

18. The non-transitory computer readable storage media of claim 15, wherein the neural network feeds forwards one or more of:
   a feature in a previous feature map;
   an object detected in a previous frame or time period; or
   a feature in a previous depth map.

19. The non-transitory computer readable storage media of claim 15, wherein the instructions further cause the one or more processors to:
   generate a subsequent first feature map based on a subsequent depth map that is based on subsequent range data;
   generate a subsequent second feature map based on a subsequent image; and
   feed forward one or more of a feature of the first feature map or the second feature map using recurrent connections in the neural network.

20. The non-transitory computer readable storage media of claim 15, wherein the neural network comprises an input layer, one or more hidden layers, and a classification layer, wherein a recurrent connection of the neural network feeds an output of the classification layer from the previous frames into one or more of the input layer or a hidden layer of the one or more hidden layers during generating the feature map or detecting the one or more objects.

* * * * *